(12) United States Patent
Kim et al.

(10) Patent No.: US 10,778,878 B2
(45) Date of Patent: Sep. 15, 2020

(54) APPARATUS FOR PROCESSING IMAGE AND METHOD OF PROCESSING IMAGE

(71) Applicant: Hanwha Techwin Co., Ltd., Seongnam-si, Gyeonggi-do (KR)

(72) Inventors: Seong Gon Kim, Seongnam-si (KR); Yun Seok Kwon, Seongnam-si (KR)

(73) Assignee: Hanwha Techwin Co., Ltd., Seongnam-si, Gyeonggi-do (KR)

( * ) Notice: Subject to any disclaimer, the term of this patent is extended or adjusted under 35 U.S.C. 154(b) by 0 days.

(21) Appl. No.: 16/026,157

(22) Filed: Jul. 3, 2018

(65) Prior Publication Data

US 2019/0020810 A1 Jan. 17, 2019

(30) Foreign Application Priority Data

Jul. 11, 2017 (KR) .......................... 10-2017-0087776

(51) Int. Cl.
*H04N 19/117* (2014.01)
*H04N 5/232* (2006.01)
(Continued)

(52) U.S. Cl.
CPC ..... *H04N 5/23206* (2013.01); *H04N 5/23229* (2013.01); *H04N 5/23232* (2013.01);
(Continued)

(58) Field of Classification Search
CPC ........... H04N 5/23232; H04N 5/23296; H04N 19/117
See application file for complete search history.

(56) References Cited

U.S. PATENT DOCUMENTS 5,886,744 A * 3/1999 Hannah ............... H04N 19/503
348/207.99
7,645,236 B2 1/2010 Simopoulos et al.
(Continued)

FOREIGN PATENT DOCUMENTS

EP 3 136 726 A1 3/2017
KR 10-2006-0129713 A 12/2006
(Continued)

OTHER PUBLICATIONS

Communication dated Dec. 7, 2018 issued by the European Intellectual Property Office in counterpart European Application No. 18182922.7.

*Primary Examiner* — Brian T Pendleton
*Assistant Examiner* — Frank Johnson
(74) *Attorney, Agent, or Firm* — McLean IP Global; Jason Y. Pahng

(57) ABSTRACT

An apparatus for processing an image includes a camera configured to obtain a fixed image signal based on non-movement of the camera and obtain a variable image signal based on movement of the camera; a communication interface configured to receive a command; a driver configured to move the camera in response to the command; and a processor configured to process the fixed image signal based on a fixed image signal process parameter value, and process the variable image signal based on a variable image signal process parameter value, the variable image signal process parameter value having an image signal process parameter value based upon which a high frequency component of the variable image signal is reduced.

19 Claims, 5 Drawing Sheets

(51) Int. Cl.
*H04N 19/156* (2014.01)
*H04N 7/18* (2006.01)
*H04N 19/115* (2014.01)
*H04N 19/146* (2014.01)
*H04N 19/196* (2014.01)
*B60R 11/04* (2006.01)

(52) U.S. Cl.
CPC ......... *H04N 5/23296* (2013.01); *H04N 7/183* (2013.01); *H04N 19/115* (2014.11); *H04N 19/117* (2014.11); *H04N 19/146* (2014.11); *H04N 19/156* (2014.11); *H04N 19/196* (2014.11); *B60R 11/04* (2013.01); *H04N 5/23299* (2018.08)

(56) References Cited

U.S. PATENT DOCUMENTS

| | | | | |
|---|---|---|---|---|
| 2002/0047911 | A1* | 4/2002 | Tsuchiya | H04N 1/407 348/252 |
| 2005/0276505 | A1* | 12/2005 | Raveendran | H04N 19/176 382/268 |
| 2009/0046943 | A1* | 2/2009 | Ishiga | G06T 5/10 382/266 |
| 2009/0147090 | A1* | 6/2009 | Miki | H04N 5/23248 348/208.1 |
| 2009/0323803 | A1* | 12/2009 | Gomila | H04N 19/156 375/240.02 |
| 2010/0157070 | A1* | 6/2010 | Mohanty | H04N 5/23248 348/208.1 |
| 2013/0051458 | A1* | 2/2013 | Kitahara | H04N 19/15 375/240.03 |
| 2013/0128123 | A1* | 5/2013 | Rifkah | G06T 5/002 348/607 |
| 2013/0235928 | A1* | 9/2013 | Chung | H04N 19/172 375/240.03 |
| 2015/0172705 | A1* | 6/2015 | Lee | H04N 19/57 375/240.16 |
| 2016/0261798 | A1* | 9/2016 | Ishikawa | H04N 5/2254 |
| 2017/0064338 | A1* | 3/2017 | Martins | H04N 19/426 |

FOREIGN PATENT DOCUMENTS

| | | |
|---|---|---|
| KR | 10-2011-0083376 A | 7/2011 |
| KR | 10-1247242 B1 | 3/2013 |
| KR | 10-1532861 B1 | 6/2015 |
| KR | 10-2015-0101313 A | 9/2015 |
| WO | 2012/125862 A1 | 9/2012 |

* cited by examiner

APPARATUS FOR PROCESSING IMAGE AND METHOD OF PROCESSING IMAGE

CROSS-REFERENCE TO THE RELATED APPLICATION

This application claims priority to Korean Patent Application No. 10-2017-0087776, filed on Jul. 11, 2017, in the Korean Intellectual Property Office, the disclosure of which is incorporated herein in its entirety by reference.

BACKGROUND

1. Field

One or more exemplary embodiments relate to an apparatus for processing an image and a method of processing an image, and more particularly, to an apparatus for processing an image and a method of processing an image, which maintain a constant output bitrate of a camera.

2. Description of the Related Art

Surveillance systems have been used for various purposes such as monitoring purposes and preventive purposes.

A network camera in a surveillance system receives an analog input, encodes image data converted to digital data by using a compression algorithm such as JPEG, MPEG4, H.264, or H.265, and transmits the encoded data through a network line. Also, the network camera may not only show a specific region, but may also change a camera direction and enlarge a region to view a user-desired location by using functions such as pan, tilt, and zoom.

In this case, when the network camera moves to a desired location by using pan, tilt, zoom, etc., image data including a large amount of movements and changes are input, and when this image data is compressed, the image data are output as a large amount of data due to a characteristic of a compression algorithm. Therefore, a heavy load is applied to the network camera.

When a data output amount of the network camera is fixed so as not to provide a heavy load to the network camera, the image quality of image data including a large amount of movements and changes is remarkably reduced.

SUMMARY

One or more exemplary embodiments include image processing technology for generating an image signal having an output bitrate equal to or less than a target bitrate.

One or more exemplary embodiments provides an apparatus and a method for processing an image in which image data including a large amount of movement and changes are prevented from having sharp deterioration of image quality.

Additional aspects will be set forth in part in the description which follows and, in part, will be apparent from the description, or may be learned by practice of the presented embodiments.

According to an aspect of an exemplary embodiment, there is provided an apparatus for processing an image, the apparatus including: a camera configured to obtain a fixed image signal based on non-movement of the camera and obtain a variable image signal based on movement of the camera; a communication interface configured to receive a command; a driver configured to move the camera in response to the command; and a processor configured to process the fixed image signal based on a fixed image signal process parameter value by setting an image signal process parameter value to the fixed image signal process parameter value, and process the variable image signal based on a variable image signal process parameter value by setting the image signal process parameter value to the variable image signal process parameter value, wherein the variable image signal process parameter value has the image signal process parameter value based upon which a high frequency component of the variable image signal is reduced.

The processor may estimate a movement velocity of the camera based on the command, and determine the variable image signal process parameter value based on the movement velocity of the camera.

The processor may gradually change the image signal process parameter value to the variable image signal process parameter value, which is determined based on the movement velocity of the camera.

The driver may perform a pan-tilt-zoom (PTZ) operation of the camera in response to the command.

The processor may estimate a velocity of a PTZ operation of the camera based on the command, and determine the variable image signal process parameter value based on the velocity of the PTZ operation.

The processor may gradually change the image signal process parameter value to the variable image signal process parameter value, which is determined based on the velocity of the PTZ operation.

When the camera is mounted on a vehicle, and a movement velocity of the vehicle changes in response to a movement command of the vehicle, the processor may determine the variable image signal process parameter value based on the movement velocity of the vehicle.

The processor may estimate the movement velocity of the vehicle based on the movement command of the vehicle, and determine the variable image signal process parameter value based on the estimated movement velocity of the vehicle.

The processor may gradually change the image signal process parameter value to the variable image signal process parameter value, which is determined based on the movement velocity of the vehicle.

The image signal process parameter value may include at least one of an edge strength, a strength of a noise removal filter, or a strength of a high frequency removal filter.

The edge strength may include at least one of an edge gain value, an edge thickness, or an edge coring level.

An output bitrate of each of the processed variable image signal and the processed fixed image signal may be equal to or less than a preset target bitrate.

According to an aspect of another exemplary embodiment, there is provided a method of processing an image, the method including: obtaining, by a camera, a fixed image signal based on non-movement of the camera, and processing, by a processor, the fixed image signal based on a fixed image signal process parameter value; upon receiving a command through a communication interface, setting, by the processor, an image signal process parameter value to a variable image signal process parameter value based on the command; obtaining a variable image signal based on movement of the camera, the camera being moved by a driver in response to the command, and processing, by the processor, the variable image signal based on the variable image signal process parameter value, wherein the variable image signal process parameter value has the image signal process parameter value based upon which a high frequency component of the variable image signal is reduced.

The camera may be moved according to a pan-tilt-zoom (PTZ) operation by the driver in response to the command.

The processor may respectively apply different variable image signal process parameter values to a region of interest and a region of non-interest.

The command may include a zoom command, and processing the variable image signal may include processing the variable image signal based on a plurality of variable image signal process parameter values such that a high frequency component of an edge region of the camera is removed more than a high frequency component of a central region of the camera.

The image signal process parameter value may include at least one of an edge strength, a strength of a noise removal filter, or a strength of a high frequency removal filter.

The method may further include, prior to the receiving of the command: receiving a tentative movement command through the communication interface; obtaining, by the camera, a tentative variable image signal based on tentative movement of the camera, by the driver, in response to the tentative movement command; processing, by the processor, the tentative variable image signal based on a current image signal process parameter value; when an output bitrate of the processed tentative variable image signal is equal to or less than a target bitrate, setting, by the processor, the variable image signal process parameter value to the current image signal process parameter value; and when the output bitrate exceeds the target bitrate, changing, by the processor, the current image signal process parameter value such that the output bitrate is equal to or less than the target bitrate.

The changing the current image signal process parameter value may include changing at least one of a current edge strength, a strength of a current noise removal filter, or a strength of a current high frequency removal filter.

The method may further include performing compression on the processed fixed image signal and the processed variable image signal.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
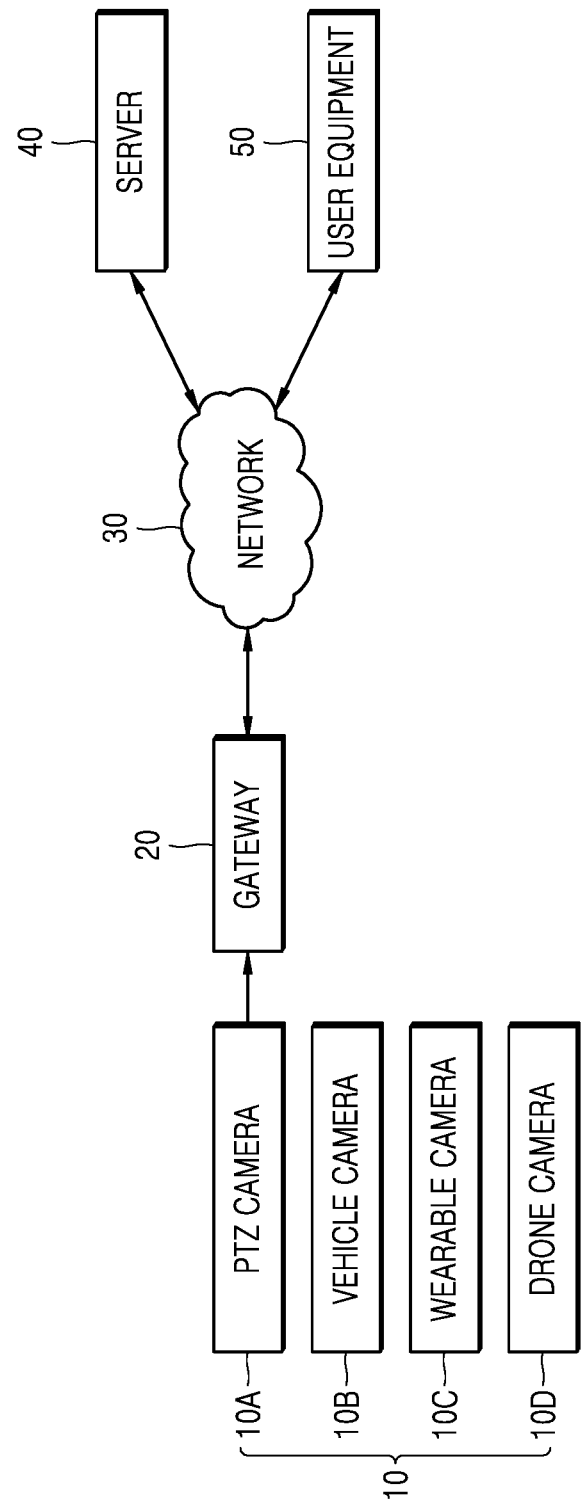
FIG. 1 is a view for explaining a surveillance system according to an exemplary embodiment.

As the disclosure allows for various changes and numerous embodiments, exemplary embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. In the description of the disclosure, certain detailed explanations of the related art are omitted when it is deemed that they may unnecessarily obscure the essence of the disclosure.

Expressions such as "at least one of" when preceding a list of elements, modify the entire list of elements and do not modify the individual elements of the list While such terms as "first," "second," etc., may be used to describe various components, such components must not be limited to the above terms. The above terms are used only to distinguish one component from another.

The terms used in the embodiments are merely used to describe exemplary embodiments, and are not intended to limit the disclosure. An expression used in the singular encompasses the expression of the plural, unless it has a clearly different meaning in the context. In the specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The disclosure may be described in terms of functional block components and various processing steps. Such functional blocks may be realized by any number of hardware and/or software components configured to perform the specified functions. For example, the disclosure may employ various integrated circuit (IC) components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the disclosure could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

According to embodiments, an image signal may be more smoothly transmitted by preventing a sharp increase of an output bitrate of the image signal despite movement of a network camera.

Also, according to embodiments, in the case where a network camera moves, even when an output bitrate of an image signal is adjusted to a target bitrate or less, constant image quality of the image signal may be maintained.

Also, according to embodiments, a constant transmission load of an image signal may be maintained by processing the image signal in response to a velocity in which a network camera moves.

Also, according to embodiments, an image signal having image quality desired by a user may be provided by performing image-processing differently for each region with respect to even one image signal.

Also, according to embodiments, an image signal suitable for a user need may be provided by processing an image signal in response to a user input.

Hereinafter, various embodiments are described with reference to the accompanying drawings.

FIG. 1 is a view for explaining a surveillance system 1 according to an embodiment.

Referring to FIG. 1, the surveillance system 1 includes a camera 10, a gateway 20, a network 30, a server 40, and user equipment 50.

The surveillance system 1 may provide a configuration in which, when information of the camera 10 collected by the gateway 20 is transmitted to the server 40 through the network 30, the information transmitted to the server 40 may be monitored by using the user equipment 50.

The camera 10 may include, for example and not limited to, a pan-tilt-zoom (PTZ) camera 10a, a vehicle camera 10b, a wearable camera 10c, and a drone camera 10d.

The PTZ camera 10a may capture a surveillance region to obtain an image regarding the surveillance region. The PTZ camera 10a may capture the surveillance region in real time for the purpose of surveillance or security. The PTZ camera 10a may include a plurality of PTZ cameras.

The PTZ camera 10a may be a low power camera driven by a battery. The PTZ camera 10a may normally maintain a sleep mode, and periodically wake up to check whether an event has occurred. In the case when an event has occurred, the PTZ camera 10a may switch to an active mode, and in the case when an event has not occurred, the PTZ camera 10a may return to the sleep mode. When object information is received even if an event does not occur, the PTZ camera 10a may switch to a standby mode. As described above, the PTZ camera 10a may reduce power consumption by maintaining the standby mode only when object information is received, and maintaining the active mode only when an event has occurred.

The PTZ camera 10a may include a sensor configured to sense an event. The sensor may be installed outside the PTZ camera 10a to communicate with the PTZ camera 10a.

The sensor may sense whether an event occurs in a sensing region for the purpose of surveillance or security. The sensor may include, for example and not limited to, a sound sensor, an infrared sensor, a motion sensor, a gas sensor, a leakage sensor, a temperature sensor, a humidity sensor, an acceleration sensor, a gyro sensor, a tactile sensor, a pressure sensor, and a vibration sensor.

The PTZ camera 10a may change a surveillance region by performing a PTZ operation. The PTZ operation may include at least one of a pan operation, a tilt operation, and a zoom operation. The PTZ camera 10a may perform the PTZ operation in response to a user input and/or event sensing.

The PTZ camera 10a may communicate with the gateway 20 by using various communication methods such as wired and/or wireless local area network (LAN), Wi-Fi, ZigBee, Bluetooth, and near field communication. For example, the PTZ camera 10a may communicate with the gateway 20 according to a low power wireless communication protocol which uses a radio frequency in an industrial scientific medical (ISM) band.

The vehicle camera 10b may be mounted on a vehicle. The vehicle camera 10b may be mounted outside and/or inside the vehicle.

The vehicle camera 10b may capture an outside and/or inside of the vehicle to obtain an image regarding the outside and/or inside of the vehicle. The vehicle camera 10b may capture the outside and/or inside of the vehicle for the purpose of driving control or accident prevention. One or more vehicle cameras 10b may be provided.

The vehicle camera 10b may operate in the sleep mode or the active mode depending on whether the vehicle is driven and/or whether an event occurs.

For example, in the case where the vehicle is parked, the vehicle camera 10b may normally maintain the sleep mode, and switch to the active mode when an event occurs.

For example, in the case where the vehicle is parked, the vehicle camera 10b may maintain the sleep mode, and switch to the active mode when the vehicle is driven or starts to be driven.

For example, in the case where the vehicle does not move, the vehicle camera 10b may maintain the sleep mode, and switch to the active mode when the vehicle moves.

The vehicle camera 10b may include a sensor configured to sense an event. The sensor may be mounted to the vehicle to communicate with the vehicle camera 10b.

The sensor may sense in real time whether an event occurs in a sensing region for the purpose of driving control or accident prevention. The sensor may include, for example and not limited to, a sound sensor, an infrared sensor, a motion sensor, a gas sensor, a leakage sensor, a temperature sensor, a humidity sensor, an acceleration sensor, a gyro sensor, a tactile sensor, a pressure sensor, and a vibration sensor.

The vehicle camera 10b may change a surveillance region when the vehicle moves.

The vehicle camera 10b may communicate with the gateway 20 by using various communication methods such as wired and/or wireless local area network (LAN), Wi-Fi, ZigBee, Bluetooth, and near field communication.

The wearable camera 10c may be directly or indirectly mounted on a user's body. For example, the wearable camera 10c may be mounted on glasses, a watch, clothes, etc.

The wearable camera 10c may capture an outside of a user to obtain an image of the outside of the user. The wearable camera 10c may provide information to the user by capturing the user's neighboring environment at directions and angles outside the user's viewing angle. One or more wearable cameras 10c may be provided.

The wearable camera 10c may operate in the sleep mode or the active mode depending on whether the user moves and/or whether an event occurs.

For example, in the case where the user does not make a movement or does not move, the wearable camera 10c may normally maintain the sleep mode, and switch to the active mode when an event occurs.

For example, in the case where the user does not make a movement or does not move, the wearable camera 10c may maintain the sleep mode, and switch to the active mode when the user makes a movement or moves.

The wearable camera 10c may include a sensor configured to sense an event. The sensor may be positioned outside of the wearable camera 10c. For example, the wearable camera 10c may be mounted on glasses, and the sensor may be mounted on clothes to communicate with the wearable camera 10c.

The wearable camera 10c may change a surveillance region when the user moves.

The wearable camera 10c may communicate with the gateway 20 by using various communication methods such as wired and/or wireless local area network (LAN), Wi-Fi, ZigBee, Bluetooth, and near field communication.

The drone camera 10d may be mounted on an unmanned airplane. The drone camera 10d may be mounted an outside and/or inside of the unmanned airplane.

The drone camera 10d may capture the outside and/or inside of the unmanned airplane to obtain an image regarding the outside and/or inside of the unmanned airplane. The drone camera 10d may capture the outside and/or inside of the unmanned airplane in real time for the purpose of driving control, accident prevention, or surveillance of a neighboring environment. One or more drone cameras 10d may be provided.

The drone camera 10d may operate in the sleep mode or the active mode depending on whether the unmanned airplane is driven and/or an event occurs.

For example, in the case where the unmanned airplane is stationary, the drone camera 10d may normally maintain the sleep mode, and switch to the active mode when an event occurs.

For example, in the case where the unmanned airplane is stationary, the drone camera 10d may maintain the sleep mode, and switch to the active mode when the unmanned airplane moves.

The drone camera 10d may include a sensor configured to sense an event. The sensor may communicate with the drone camera 10d mounted on the unmanned airplane.

The drone camera 10d may change a surveillance region when the unmanned airplane moves.

The drone camera 10d may communicate with the gateway 20 by using various communication methods such as wired and/or wireless local area network (LAN), Wi-Fi, ZigBee, Bluetooth, and near field communication.

The gateway 20 may transmit a command and/or an alarm to another camera 10 or the user equipment 50 based on information transmitted from the camera 10.

The gateway 20 may transmit information to the server 40 and receive a command from the server 40 by using various wired and/or wireless communication methods such as Ethernet, Wi-Fi, and Bluetooth.

The network 30 may include a wired network or a wireless network. The wireless network may be a 2-generation (2G) or 3G cellular communication system, a 3rd generation partnership project (3GPP), a 4G communication system, a long term evolution (LTE), world interoperability for microwave access (WiMAX), etc.

The server 40 may transmit a notice to the user equipment 50 based on information transmitted from the camera 10 and/or the gateway 20 through the network 30, and transmit a command transmitted from the user equipment 50 to the camera 10 or the gateway 20.

The user equipment 50 may display and store information transmitted from the server 40. For example, the user equipment 50 may display an alarm transmitted from the server 40. The user equipment 50 may include at least one processor. The user equipment 50 may be included in another hardware such as a microprocessor or a general-purpose computer system and driven. The user equipment 50 may be a personal computer or a mobile terminal.

The user equipment 50 may include a user interface configured to control an operation of the camera 10, the gateway 20, or the server 40.

An apparatus 100 for processing an image (see FIG. 2) according to embodiments may be implemented as one physical apparatus, or implemented as a plurality of physical apparatuses organically combined. For this purpose, some of a configuration of the apparatus 100 for processing an image may be implemented or provided as one of physical apparatuses and/or components, and other some of the configuration of the apparatus 100 for processing an image may be implemented or provided as other physical apparatuses and/or components. In this case, one of the physical apparatuses may be implemented as a portion of the camera 10, and another physical apparatus may be implemented as a portion of the gateway 20, the server 40, and/or the user equipment 50. The apparatus 100 for processing an image may be provided in the camera 10, the gateway 20, the server 40, or the user equipment 50, or may be applied to an apparatus provided separately from the camera 10, the gateway 20, the server 40, or the user equipment 50.

Figure 2:
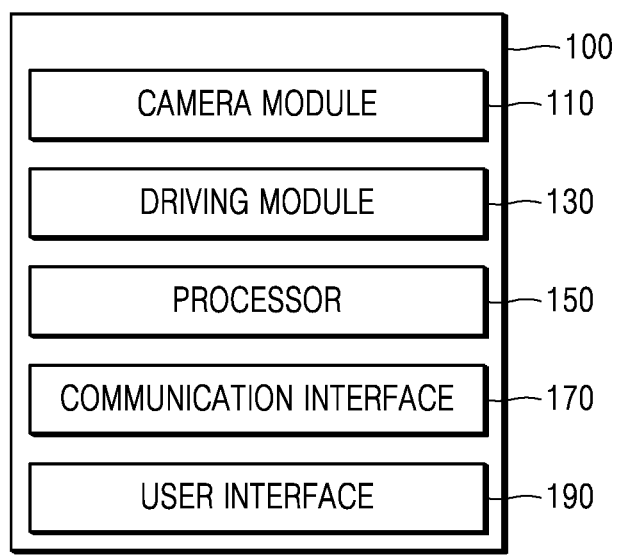
FIG. 2 is a block diagram of a configuration of an apparatus for processing an image, according to an exemplary embodiment.

FIG. 2 is a block diagram of a configuration of an apparatus for processing an image according to an embodiment.

Referring to FIG. 2, the apparatus 100 for processing an image according to an embodiment includes a camera module (or a camera) 110, a driving module (or a driver, or a driver circuitry) 130, a processor 150, a communication interface 170 (or a communication interface circuitry), and a user interface (or a user interface circuitry) 190.

The camera module 110 obtains an image signal.

The camera module 110 may include a lens configured to optically process light from an object, an image pick-up element configured to convert light incident through the lens to an electric analog image signal, and a converter configured to convert an analog image signal to a digital image signal. The camera module 110 is not limited thereto.

An image signal may be a fixed image signal or a variable image signal (or changed image signal).

For example, a fixed image signal denotes an image signal obtained by the PTZ camera 10a not performing a PTZ operation, and a variable image signal denotes an image signal obtained by the PTZ camera 10a performing the PTZ operation. In other words, the camera module 110 may obtain a fixed image signal when the PTZ operation is not performed, and obtain a variable image signal when the PTZ operation is performed.

For example, a fixed image signal denotes an image signal obtained by the vehicle camera 10b in the case where a vehicle does not move, and a variable image signal denotes an image signal obtained by the vehicle camera 10b in the case where the vehicle moves. In other words, the camera module 110 may obtain a fixed image signal when the vehicle does not move, and obtain a variable image signal when the vehicle moves.

For example, a fixed image signal denotes an image signal obtained by the vehicle camera 10b in the case where an object does not move, and a variable image signal denotes an image signal obtained by the vehicle camera 10b in the case where the object moves. In other words, the camera module 110 may obtain a fixed image signal when the object does not move, and obtain a variable image signal when the object moves.

The driving module 130 moves the camera module 110 in response to a movement command.

For example, the driving module 130 may PTZ-drive the camera module 110 (or drive a PTZ operation of the camera module 110) in response to a PTZ command.

The driving module 130 may pan-rotate the camera module 110 in a horizontal direction by 360°, and tilt-rotate the camera module 110 in a vertical direction by 180°. The driving module 130 may move a zoom lens and a focus lens of the camera module 110.

The driving module 130 may PTZ-drive the camera module 110 in a preset velocity.

A PTZ command may be a user input transmitted from the user equipment 50, an event sensing signal transmitted from the sensor, etc. and is not limited thereto.

For example, the driving module 130 may change a movement velocity of a vehicle in response to a movement command of the vehicle. The driving module 130 may increase or reduce the movement velocity of the vehicle (or the vehicle camera 10*b*) in response to a movement command of the vehicle. The driving module 130 may change a movement velocity of the vehicle camera 10*b* according to a movement velocity of the vehicle.

The movement command of the vehicle may be received through a steering wheel, a brake, or an accelerator mounted on the vehicle, or may be a user input transmitted from the user equipment 50, and is not limited thereto.

Compared with a fixed image signal, a variable image signal has a reduced compression efficiency and an increased output bitrate. As a result, an output bitrate of a fixed image signal may be a target bitrate or less, and an output bitrate of a variable image signal may exceed the target bitrate. Alternatively, both the output bitrate of the fixed image signal and the output bitrate of the variable image signal may exceed the target bitrate. For smooth transmission in real time, it is desirable to reduce the output bitrates of the fixed image signal and the variable image signal to the target bitrate or less.

The processor 150 processes an image signal.

Specifically, the processor 150 may maintain output bitrates of a fixed image signal and a variable image signal at a target bitrate or less by processing the fixed image signal based on a fixed image signal process parameter value and processing the variable image signal based on a variable image signal process parameter value.

In detail, when the communication interface 170 receives a movement command, the driving module 130 moves the camera module 110 in response to the movement command, and a variable image signal is obtained by the camera module 110 while the driving module 130 moves the camera module 110. The processor 150 sets an image signal process parameter value to a variable image signal process parameter value based on the movement command, and processes a variable image signal based on the variable image signal process parameter value.

The image signal process parameter value may include at least one of an edge strength, a strength of a noise removal filter, and a strength of a high frequency removal filter. The edge strength may include at least one of an edge gain value, an edge thickness, and an edge coring level. The high frequency removal filter may be, for example, a low pass filter.

When the edge strength is weak, or the strength of the noise removal filter is strong, or the strength of the high frequency removal filter is strong, an edge of an image may be blur-processed. In this case, since a changed image (that is, an image based on a variable image signal) is an image that is originally blurred by the movement of the camera module 110, even when the changed image is blur-processed based on a variable image signal process parameter value, image quality of the changed image may be substantially the same or similar.

On the other hand, before a movement command is received by the communication interface 170, or after movement of the camera module 110 is completed (or when there is no movement of the camera module 110), the processor 150 sets an image signal process parameter value to a fixed image signal process parameter value, and processes a fixed image signal based on the fixed image signal process parameter value.

A variable image signal process parameter value is an image signal process parameter value for reducing a high frequency component of a variable image signal.

The processor 150 may estimate (or determine) a movement velocity (or a movement speed) of the camera module 110 based on a movement command, and set an image signal process parameter value to a variable image signal process parameter value based on the movement velocity.

In this case, the processor 150 may gradually change the image signal process parameter value to the variable image signal process parameter value based on the movement velocity.

Therefore, an output bitrate of each of a variable image signal and a fixed image signal processed by the processor 150 may be a preset target bitrate or less.

In example, when a PTZ command is received by the communication interface 170, the driving module 130 may PTZ-drive the camera module 110 in response to the PTZ command, and the processor 150 may estimate a PTZ operation velocity (or a velocity of a PTZ operation) of the camera module 110 based on the PTZ command, set an image signal process parameter value to a variable image signal process parameter value based on the PTZ operation velocity of the camera module 110, and process a variable image signal based on the variable image signal process parameter value. A variable image signal is obtained by the camera module 110 while the driving module 130 PTZ-drives the camera module 110, and a variable image signal process parameter value may be an image signal process parameter value for removing a high frequency component of a variable image signal.

The processor 150 may determine a panning angle, a tilting angle, and/or a zoom magnification of the camera module 110 based on a PTZ command.

A PTZ operation velocity may be estimated based on a panning angle, a tilting angle, and/or a zoom magnification of the camera module 110. In this case, the PTZ operation velocity may change depending on the panning angle, the tilting angle, and/or the zoom magnification of the camera module 110.

The PTZ operation velocity may be a preset velocity. In this case, the PTZ operation velocity may be constant regardless of the panning angle, the tilting angle, and/or the zoom magnification of the camera module 110.

A variable image signal process parameter value may be determined in advance depending on the PTZ operation velocity of the camera module 110. When the PTZ operation velocity of the camera module 110 is higher (or has higher speed), an output bitrate of a variable image signal obtained by the camera module 110 increases. Therefore, when the PTZ operation velocity of the camera module 110 is higher, an image signal process parameter value which may remove a more high frequency component of a variable image signal may be determined as a variable image signal process parameter value.

The processor 150 may gradually change an image signal process parameter value to a variable image signal process parameter value based on the PTZ operation velocity.

For example, when a movement command of a vehicle is received by the communication interface 170, the driving module 120 may change a movement velocity of the vehicle (or the vehicle camera 10*b*) in response to the movement command of the vehicle, and the processor 150 may estimate the movement velocity of the vehicle (or the vehicle camera 10*b*) based on the movement command of the vehicle. The processor 150 may set an image signal process parameter value of the camera module 110 mounted on the vehicle to a variable image signal process parameter value based on the movement velocity of the vehicle (or the vehicle camera 10*b*), and process a variable image signal based on the variable image signal process parameter value. The variable image signal is obtained by the camera module 110 while the movement velocity of the vehicle changes, and the variable image signal process parameter value may be an image signal process parameter value for removing a high frequency component of a variable image signal.

The processor 150 may estimate the movement velocity of the vehicle based on a movement command of the vehicle, for example, a steering wheel control direction, a brake control strength, and/or an accelerator control strength of the vehicle.

A variable image signal process parameter value may be determined in advance based on a movement velocity of the vehicle. When the movement velocity of the vehicle is higher, an output bitrate of a variable image signal obtained by the camera module 110 increases. Therefore, when the movement velocity of the vehicle is fast, an image signal process parameter value which may remove a more high frequency component of a variable image signal may be determined as a variable image signal process parameter value.

The processor 150 may gradually change an image signal process parameter value to a variable image signal process parameter value based on the movement velocity of the vehicle.

The processor 150 may control a variable image signal process parameter value.

While the communication interface 170 receives a tentative movement command and the driving module 130 tentatively moves the camera module 110 in response to the tentative movement command, the camera module 110 may obtain a tentative variable image signal.

For example, while the communication interface 170 receives a tentative PTZ command and the driving module 130 PTZ-drives the camera module 110 in response to the tentative PTZ command, the camera module 110 may obtain a tentative variable image signal.

For example, while the communication interface 170 receives a tentative movement command of a vehicle and a movement velocity of the vehicle camera 10b changes in response to the tentative movement command of the vehicle, the camera module 110 mounted on the vehicle may obtain a tentative variable image signal.

The processor 150 may process the tentative variable image signal based on a current image signal process parameter value. In this case, when an output bitrate of the processed tentative variable image signal is a target bitrate or less, the processor 150 may determine the current image signal process parameter value as a variable image signal process parameter value.

When the output bitrate of the processed tentative variable image signal exceeds the target bitrate, the processor 150 may change the current image signal process parameter value such that the output bitrate becomes the target bitrate or less. For example, the processor 150 may change the current image signal process parameter value such that a high frequency component of a variable image signal is further reduced.

The processor 150 may change the current image signal process parameter value by changing at least one of a current edge strength, a strength of a current noise removal filter, and a strength of a current high frequency removal filter.

For example, when the output bitrate of the tentative variable image signal exceeds the target bitrate, the processor 150 may reduce the current edge strength, increase the strength of the current noise removal filter, or increase the strength of the current high frequency removal filter.

Consequently, an output bitrate of each of a variable image signal and a fixed image signal processed by the processor 150 may be a preset target bitrate or less. In other words, the processor 150 may control a variable image signal process parameter value and a fixed image signal process parameter value such that the output bitrate of each of the processed variable image signal and the processed fixed image signal becomes the preset target bitrate or less.

The processor 150 may process one variable image signal by applying different variable image signal process parameter values to an interested region (or a region of interest) and a non-interested region (or a region of non-interest). For example, in the case where the camera module 110 performs a zoom-in operation, the processor 150 may process a variable image signal based on a plurality of variable image signal process parameter values such that a high frequency component of an edge region of the camera module 110 is removed more than a high frequency component of a central region.

As described above, the processor 150 may determine a variable image signal process parameter value based on a movement velocity of the camera module 110, and process a variable image signal based on the determined variable image signal process parameter value.

Before a movement command is received by the communication interface 170, or after movement of the camera module 110 is completed, the camera module 110 obtains a fixed image signal, and the processor 150 sets an image signal process parameter value to a fixed image signal process parameter value, and processes a fixed image signal based on the fixed image signal process parameter value.

The processor 150 may control a fixed image signal process parameter value.

When the camera module 110 obtains a tentative fixed image signal, the processor 150 may process the tentative fixed image signal based on a current fixed image signal process parameter value.

In this case, when an output bitrate of the processed tentative fixed image signal is a target bitrate or less, the processor 150 may determine a current image signal process parameter value as a fixed image signal process parameter value.

In the case where the output bitrate of the processed tentative fixed image signal exceeds the target bitrate, the processor 150 may change the current image signal process parameter value such that the output bitrate becomes the target bitrate or less. For example, the processor 150 may change current image signal process parameter value to further reduce a high frequency component of a fixed image signal.

The communication interface 170 receives a movement command. The movement command may include, for example and not limited to, a PTZ command, a movement command of a vehicle on which the camera module 110 is mounted, etc.

The communication interface 170 may transmit an image signal processed by the processor 150 to the outside.

The user interface 190 may receive a user input.

The user interface 190 may receive a user input related to a PTZ operation of the camera module 110. The user interface 190 may receive a user input related to movement of the vehicle.

The user interface 190 may receive a user input determining the target bitrate or determining an interested region.

In detail, the user interface 190 may receive a user input determining one target bitrate applied in common to a fixed image signal and a variable image signal, or receive a user input determining a plurality of bitrates respectively applied to the fixed image signal and the variable image signal.

The user interface 190 may receive user inputs respectively determining a target bitrate applied to an interested region and a target bitrate applied to a non-interested region with respect to one variable image signal.

A variable image signal process parameter value is different from a fixed image signal process parameter value in that at least one of an edge gain value, a strength of a noise removal filter, and a strength of a high frequency removal filter thereof may be different.

A changed image is blurred and an output bitrate of a variable image signal is sharply increased by movement of the camera module 110. According to an exemplary embodiment, since a high frequency component of a variable image signal is reduced, a sharp increase of an output bitrate may be prevented. Since a changed image is an image blurred by movement, even when a high frequency component of the variable image signal is reduced, image quality of the changed image (that is, an image based on a variable image signal) is not remarkably influenced.

Therefore, according to an exemplary embodiment, an image having constant image quality and a low load may be provided regardless of movement of the camera module 110.

Figure 3:
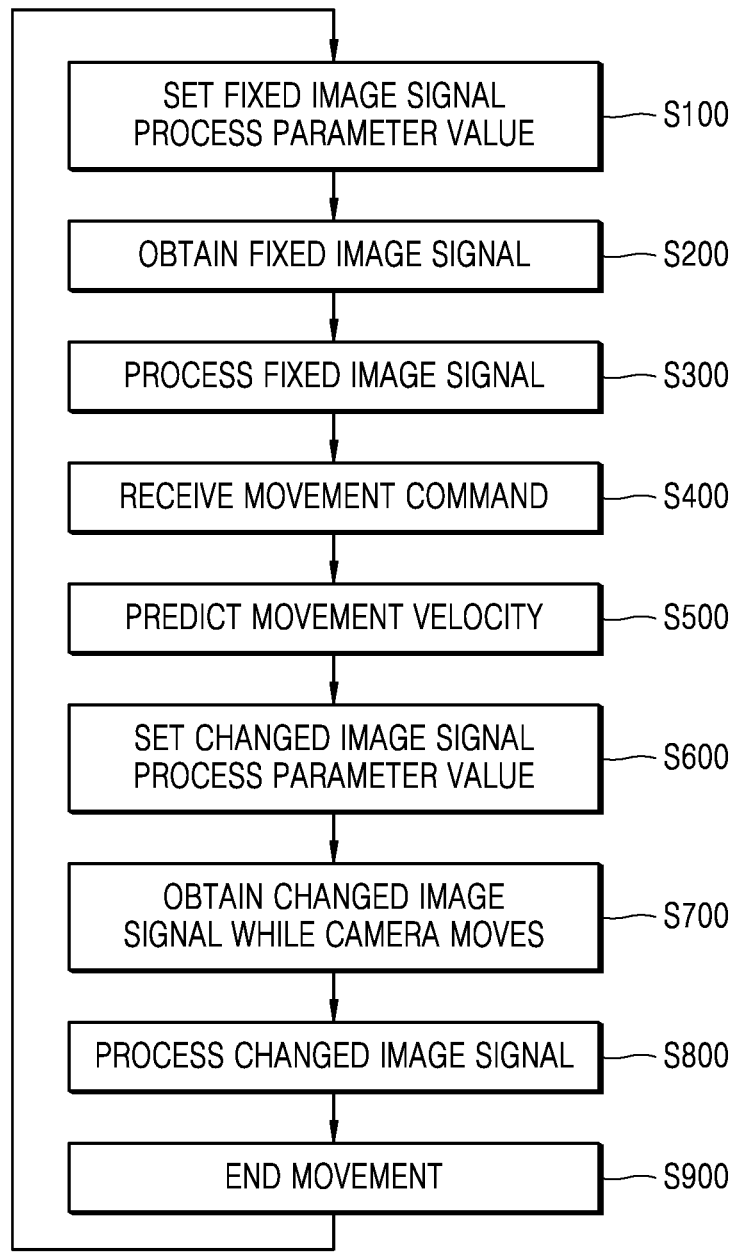
FIG. 3 is a flowchart for explaining a method of processing an image, according to an exemplary embodiment.

FIG. 3 is a flowchart for explaining a method of processing an image according to an embodiment.

Referring to FIG. 3, the processor 150 sets an image signal process parameter value to a fixed image signal process parameter value (S100).

The processor 150 may determine a fixed image signal process parameter value corresponding to a user input. For example, when the user interface 190 receives a user input selecting at least one of an edge strength, a strength of a noise removal filter, and a strength of a high frequency removal filter for a fixed image signal, the processor 150 may determine at least one of the edge strength, the strength of the noise removal filter, and the strength of the high frequency removal filter corresponding to the user input as the fixed image signal process parameter value.

The processor 150 may determine the fixed image signal process parameter value by taking into account an image process result. For example, the processor 150 may determine at least one of the edge strength, the strength of the noise removal filter, and the strength of the high frequency removal filter for the fixed image signal such that a fixed image has image quality of a preset level or a preset output bitrate. The image quality of the preset level may be image quality of an image appropriate for proper surveillance, and the preset output bitrate may be an output bitrate having a load appropriate for transmission.

The camera module 110 obtains a fixed image signal (S200). The camera module 110 may obtain the fixed image signal before the communication interface 170 receives a movement command such as a PTZ command or a movement command of a vehicle, that is, before the driving module 130 PTZ-drives the camera module 110 or a movement velocity of the vehicle changes.

Subsequently, the processor 150 processes the fixed image signal based on a fixed image signal process parameter value (S300). Therefore, the apparatus 100 for processing the image may generate a fixed image signal having an output bitrate equal to or less than a target bitrate.

The communication interface 170 receives a movement command from the outside (S400). For example, the communication interface 170 may receive a PTZ command or a movement command of a vehicle, etc.

Subsequently, the processor 150 estimates a movement velocity of the camera module 110 based on the movement command (S500), and sets an image signal process parameter value to a variable image signal process parameter value based on the movement velocity (S600).

For example, the processor 150 may estimate a PTZ operation velocity of the camera module 110 based on the PTZ command, and set an image signal process parameter value to a variable image signal process parameter value based on the PTZ operation velocity.

The processor 150 may gradually change the image signal process parameter value to the variable image signal process parameter value based on the PTZ operation velocity.

For example, the processor 150 may estimate a movement velocity of the vehicle based on a movement command of the vehicle, and set an image signal process parameter value to a variable image signal process parameter value, which is determined based on the movement velocity of the vehicle.

The processor 150 may gradually change the image signal process parameter value to the variable image signal process parameter value, which is determined based on the movement velocity of the vehicle.

The variable image signal process parameter value is an image signal process parameter value for reducing a high frequency component of the changed image.

That is, the processor 150 may change the image signal process parameter value from the fixed image signal process parameter value to the variable image signal process parameter value based on the movement velocity of the camera module 110. In this case, the variable image signal process parameter value is different from the fixed image signal process parameter value in that at least one of an edge strength, a strength of a noise removal filter, and a strength of a high frequency removal filter thereof may be different.

Hereinafter, a method of determining a variable image signal process parameter value is described with reference to FIG. 4.

Figure 4:
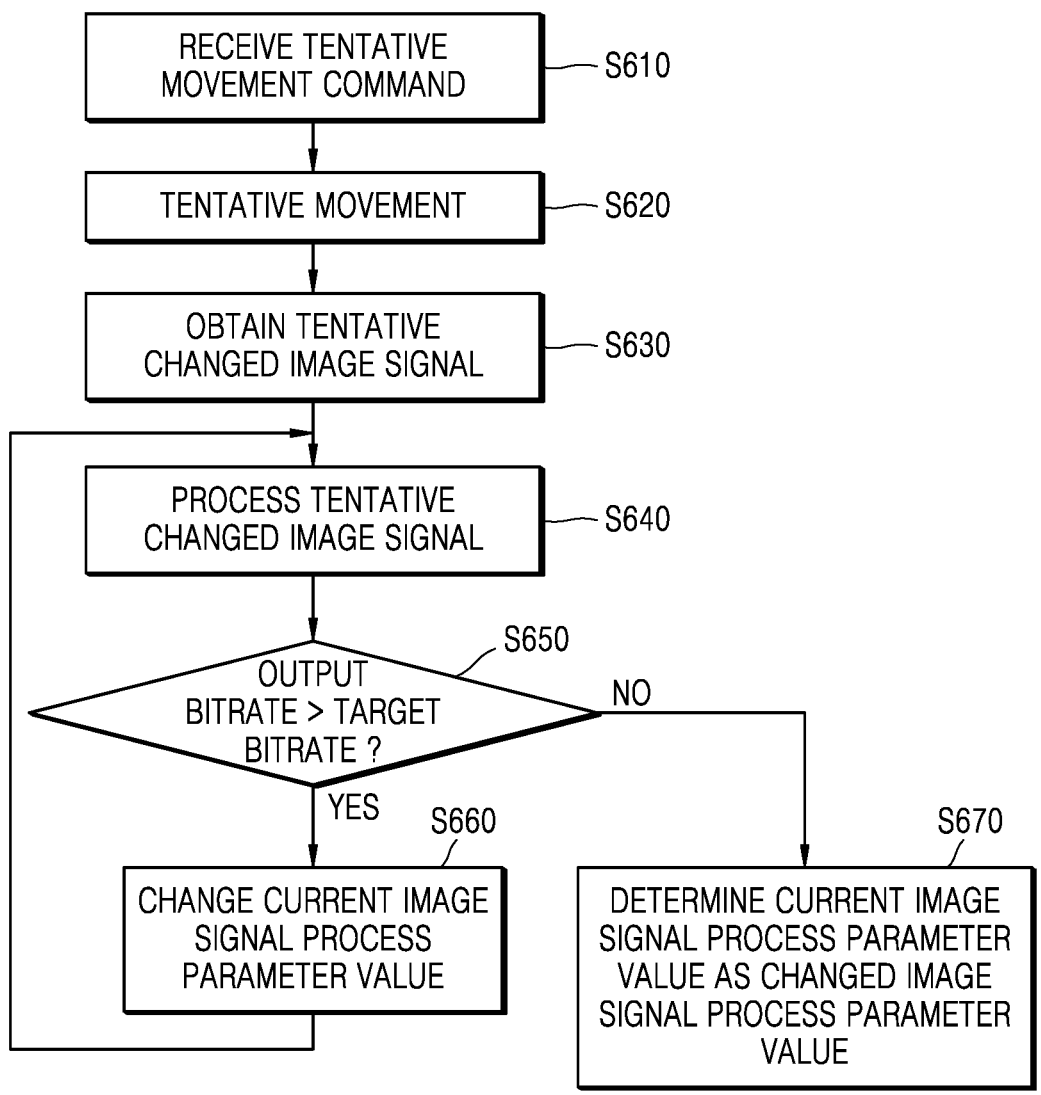
FIG. 4 is a flowchart for explaining a method of determining a variable image signal process parameter value, according to an exemplary embodiment.

FIG. 4 is a flowchart for explaining a method of determining a variable image signal process parameter value according to an embodiment.

Referring to FIG. 4, prior to performing operations illustrated in FIG. 3 are performed, the communication interface 170 receives a tentative movement command from the outside (S610).

For example, the communication interface 170 may receive a tentative PTZ command or a tentative movement command of a vehicle, etc.

Subsequently, while the driving module 130 tentatively moves the camera module 110 in response to the tentative movement command (S620), the camera module 110 obtains a tentative variable image signal (S630).

For example, while the driving module 130 PTZ-drives the camera module 110 in response to a tentative PTZ command, the camera module 110 may obtain a tentative variable image signal.

For example, while the driving module 130 changes a movement velocity of the vehicle in response to a tentative movement command of the vehicle, the camera module 110 mounted on the vehicle may obtain a tentative variable image signal.

Subsequently, the processor 150 processes the tentative variable image signal based on a current image signal process parameter value (S640).

In this case, the processor 150 compares an output bitrate of the processed tentative variable image signal with a target bitrate (S650).

When the output bitrate of the processed tentative variable image signal is the target bitrate or less (S650), the processor 150 determines a current image signal process parameter value as a variable image signal process parameter value (S670).

When the output bitrate of the processed tentative variable image signal exceeds the target bitrate (S650), the processor 150 changes the current image signal process parameter value (S660).

Hereinafter, a method of changing a variable image signal process parameter value is described with reference to FIG. 5.

Figure 5:
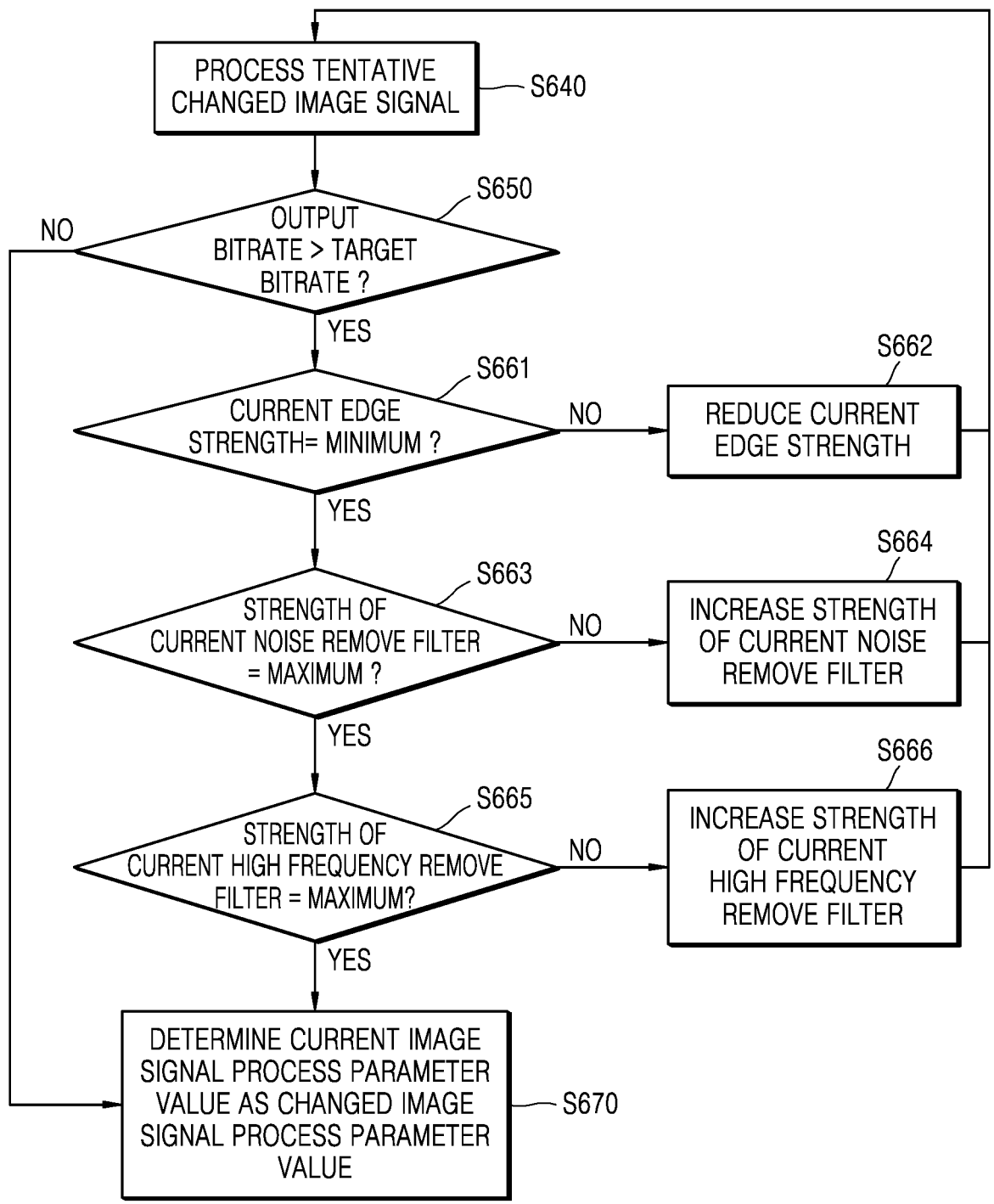
FIG. 5 is a flowchart for explaining a method of changing a variable image signal process parameter value, according to an exemplary embodiment.

FIG. 5 is a flowchart for explaining a method of changing a variable image signal process parameter value according to an embodiment.

Referring to FIG. 5, when the output bitrate of the processed tentative variable image signal exceeds the target bitrate, the processor 150 determines whether a current edge strength is minimum (S661). For example, the processor 150 may determine whether a current edge gain value is 0.

When the current edge strength is not minimum (S661), the processor 150 reduces the current edge strength (S662). For example, the processor 150 may reduce a current edge gain value.

When the current edge strength is minimum (S661), the processor 150 determines whether a strength of a current noise removal filter is maximum (S663). For example, when the current edge gain value is 0, the processor 150 may determine whether the strength of the current noise removal filter is maximum.

When the strength of the current noise removal filter is not maximum (S663), the processor 150 increases a strength of the current noise removal filter (S664).

When the strength of the current noise removal filter is maximum (S663), the processor 150 determines whether a strength of a current high frequency removal filter is maximum (S665).

When the strength of the current high frequency removal filter is not maximum (S665), the processor 150 increases the strength of the current high frequency removal filter (S666).

When the strength of the current high frequency removal filter is maximum (S665), the processor 150 determines a current image signal process parameter value as a variable image signal process parameter value (S670).

The processor 150 may repeat at least one of operation S662 of reducing the strength of the current edge strength, operation S664 of increasing the strength of the current noise removal filter, and operation S666 of increasing the strength of the current high frequency removal filter until an output bitrate of the tentative variable image signal becomes the target bitrate or less.

According to the an exemplary embodiment, since a variable image signal process parameter value has an image signal process parameter value within an image signal process parameter value range in which a current edge strength is minimum, a strength of a current noise removal filter is maximum, and a strength of a current high frequency removal filter is maximum, a variable image signal having an output bitrate equal to or less than the target bitrate may be generated.

A method of changing a variable image signal process parameter value is not limited to the method illustrated in FIG. 5. The processor 150 may change a variable image signal process parameter value by changing at least one of a current edge strength, a strength of a current noise removal filter, and a strength of a current high frequency removal filter. The processor 150 may change priorities of operation S661 of determining whether the current edge strength is minimum, operation S663 of determining whether the strength of the current noise removal filter is maximum, and operation S665 of determining whether the strength of the current high frequency removal filter is maximum.

Referring to FIG. 3 again, while the driving module 130 moves the camera module 110 in response to a movement command, the camera module 110 obtains a variable image signal (S700).

For example, while the driving module 130 PTZ-drives the camera module 110 in response to a PTZ command, the camera module 110 may obtain a variable image signal.

For example, while the driving module 130 changes a movement velocity of a vehicle in response to a movement command of the vehicle, the camera module 110 may obtain a variable image signal.

The processor 150 processes a variable image signal based on a variable image signal process parameter value. Accordingly, the apparatus 100 for processing an image may generate a variable image signal having an output bitrate equal to or less than the target bitrate.

When the camera module 110 stops moving (S900), the processor 150 sets an image signal process parameter value to a fixed image signal process parameter value again. In this case, the processor 150 may set an image signal process parameter value of the time at which the movement of the camera module 110 ends, to the fixed image signal process parameter value. The processor 150 may set an image signal process parameter value to a fixed image signal process parameter value before or after a preset period from the time at which the movement of the camera module 110 ends.

That is, when the movement of the camera module 110 is completed, the processor 150 may change an image signal process parameter value from a variable image signal process parameter value to a fixed image signal process parameter value. Accordingly, the apparatus 100 for processing an image may maintain image quality of a fixed image signal at a preset level or more.

Above processes performed by the apparatus 100 for processing an image may correspond to preprocessing operations before an image signal is compressed, and is not limited thereto.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The "unit" or "module" used herein may be a hardware component such as a processor or a circuit, and/or a software component that is executed by a hardware component such as a processor.

While disclosure has been particularly shown and described with reference to exemplary embodiments thereof, it will be understood by those skilled in the art that various changes in form and details may be made therein without departing from the spirit and scope of the disclosure as defined by the appended claims.

The exemplary embodiments should be considered in descriptive sense only and not for purposes of limitation. Therefore, the scope of the disclosure is defined not by the detailed description of the disclosure but by the appended claims, and all differences within the scope will be construed as being included in the disclosure.

What is claimed is:

1. An apparatus for processing an image, the apparatus comprising:
    a camera configured to obtain a fixed image signal based on non-movement of the camera and obtain a variable image signal based on movement of the camera; a communication interface configured to receive a command;
    a driver configured to move the camera in response to the command; and
    a processor configured to process the fixed image signal based on a fixed image signal process parameter value by setting an image signal process parameter value to the fixed image signal process parameter value, and process the variable image signal based on a variable image signal process parameter value by setting the image signal process parameter value to the variable image signal process parameter value,
    wherein the processor repeats reducing a current edge strength, increasing strength of a current noise remove filter, and increasing strength of a current high frequency remove filter until an output bitrate of the variable image signal becomes a preset target bitrate or less.

2. The apparatus of claim 1, wherein the processor is further configured to estimate a movement velocity of the camera based on the command, and determine the variable image signal process parameter value based on the movement velocity of the camera.

3. The apparatus of claim 2, wherein the processor is further configured to gradually change the image signal process parameter value to the variable image signal process parameter value, which is determined based on the movement velocity of the camera.

4. The apparatus of claim 1, wherein the driver is further configured to perform a pan-tilt-zoom (PTZ) operation of the camera in response to the command.

5. The apparatus of claim 4, wherein the processor is further configured to estimate a velocity of a PTZ operation of the camera based on the command, and determine the variable image signal process parameter value based on the velocity of the PTZ operation.

6. The apparatus of claim 5, wherein the processor is further configured to gradually change the image signal process parameter value to the variable image signal process parameter value, which is determined based on the velocity of the PTZ operation.

7. The apparatus of claim 1, wherein, when the camera is mounted on a vehicle, and a movement velocity of the vehicle changes in response to a movement command of the vehicle, the processor is further configured to determine the variable image signal process parameter value based on the movement velocity of the vehicle.

8. The apparatus of claim 7, wherein the processor is further configured to estimate the movement velocity of the vehicle based on the movement command of the vehicle, and determine the variable image signal process parameter value based on the estimated movement velocity of the vehicle.

9. The apparatus of claim 8, wherein the processor is further configured to gradually change the image signal process parameter value to the variable image signal process parameter value, which is determined based on the movement velocity of the vehicle.

10. The apparatus of claim 1,
    wherein the processor repeats reducing the current edge strength while the current edge strength is greater than minimum or while an output bitrate of the variable image signal is greater than a preset target bitrate;
    wherein when the current edge strength becomes minimum, the processor repeats increasing strength of the current noise remove filter while the strength of the current noise remove filter is less than maximum or while the output bitrate of the variable image signal is greater than the preset target bitrate; and
    wherein when the strength of the noise remove filter becomes maximum, the processor repeats increasing strength of the current high frequency remove filter while the strength of the current high frequency remove filter is less than maximum or while the output bitrate of the variable image signal is greater than the preset target bitrate.

11. The apparatus of claim 1, wherein the current edge strength comprises at least one of an edge gain value, an edge thickness, or an edge coring level.

12. A method of processing an image, the method comprising:
    obtaining, by a camera, a fixed image signal based on non-movement of the camera, and processing, by a processor, the fixed image signal based on a fixed image signal process parameter value;
    upon receiving a command through a communication interface, setting, by the processor, an image signal process parameter value to a variable image signal process parameter value based on the command;
    obtaining a variable image signal based on movement of the camera, the camera being moved by a driver in response to the command, and processing, by the processor, the variable image signal based on the variable image signal process parameter value,
    wherein the processor repeats reducing a current edge strength, increasing strength of a current noise remove filter, and increasing strength of a current high frequency remove filter until an output bitrate of the variable image signal becomes a preset target bitrate or less.

13. The method of claim 12, wherein the camera is moved according to a pan-tilt-zoom (PTZ) operation by the driver in response to the command.

14. The method of claim 13, wherein the processor respectively applies different variable image signal process parameter values to a region of interest and a region of non-interest.

15. The method of claim 14, wherein the command comprises a zoom command, and processing the variable image signal comprises processing the variable image signal based on a plurality of variable image signal process parameter values such that a high frequency component of an edge region of the camera is removed more than a high frequency component of a central region of the camera.

16. The method of claim 12, wherein the image signal process parameter value comprises at least one of an edge strength, a strength of a noise removal filter, or a strength of a high frequency removal filter.

17. The method of claim 12, further comprising, prior to the receiving of the command:

receiving a tentative movement command through the communication interface;

obtaining, by the camera, a tentative variable image signal based on tentative movement of the camera, by the driver, in response to the tentative movement command;

processing, by the processor, the tentative variable image signal based on a current image signal process parameter value;

when an output bitrate of the processed tentative variable image signal is equal to or less than the preset target bitrate, setting, by the processor, the variable image signal process parameter value to the current image signal process parameter value; and when the output bitrate exceeds the target bitrate, changing, by the processor, the current image signal process parameter value such that the output bitrate is equal to or less than the preset target bitrate.

18. The method of claim 17, wherein the changing the current image signal process parameter value comprises changing at least one of the current edge strength, the strength of the current noise removal filter, or the strength of the current high frequency removal filter.

19. The method of claim 12, further comprising performing compression on the processed fixed image signal and the processed variable image signal.

\* \* \* \* \*